US009515595B2

(12) United States Patent
Loke

(10) Patent No.: US 9,515,595 B2
(45) Date of Patent: Dec. 6, 2016

(54) MOTOR DRIVE SWITCHED MODE POWER SUPPLY SYSTEMS AND METHODS

(71) Applicant: ROCKWELL AUTOMATION ASIA PACIFIC BUSINESS CENTER PTE. LTD., Singapore (SG)

(72) Inventor: Clare Siew Ling Loke, Singapore (SG)

(73) Assignee: Rockwell Automation Asia Pacific Business Center Pte. Ltd., Singapore (SG)

( * ) Notice: Subject to any disclaimer, the term of this patent is extended or adjusted under 35 U.S.C. 154(b) by 77 days.

(21) Appl. No.: 14/331,037

(22) Filed: Jul. 14, 2014

(65) Prior Publication Data

US 2015/0311802 A1    Oct. 29, 2015

(51) Int. Cl.
*H02P 27/00* (2006.01)
*H02M 3/335* (2006.01)
(Continued)

(52) U.S. Cl.
CPC .......... *H02P 23/00* (2013.01); *H02M 3/33523* (2013.01); *H02M 1/08* (2013.01);
(Continued)

(58) Field of Classification Search
CPC ............................ H02P 23/00; H02M 3/33523
(Continued)

(56) References Cited

U.S. PATENT DOCUMENTS 4,370,701 A    1/1983    Western
4,520,275 A    5/1985    Marusik
(Continued)

FOREIGN PATENT DOCUMENTS

EP    0150797 B1    9/1988
EP    0698959 A1    2/1996
(Continued)

OTHER PUBLICATIONS

EP Extended European Search Report for Application No. 15164823.5 mailed Sep. 8, 2015.
(Continued)

*Primary Examiner* — Bentsu Ro
*Assistant Examiner* — Zemenay Truneh
(74) *Attorney, Agent, or Firm* — Fletcher Yoder P.C.

(57) ABSTRACT

The embodiments described herein include one embodiment that provides a motor drive that includes driver circuitry that controls operation of an inverter in the motor drive to output power to a motor, control circuitry that controls operation of the driver circuitry, and a switched mode power supply that supplies electrical power to the driver circuitry, the control circuitry, or both. The switched mode power supply includes a primary coil, in which a primary controller stores electrical energy in the primary coil by selectively connecting the primary coil to a power source, and a secondary coil electrically isolated from the primary coil, in which the secondary coil outputs electrical power based at least in part on the electrical energy stored in the primary coil, in which a secondary controller controls the electrical power supplied to the driver circuitry, the control circuitry, or both by selectively connecting the secondary coil to a power output of the switched mode power supply.

20 Claims, 5 Drawing Sheets

(51) Int. Cl.
*H02P 23/00* (2016.01)
*H02M 1/08* (2006.01)
*H02M 1/00* (2006.01)
*H02P 5/00* (2016.01)

(52) U.S. Cl.
CPC .... *H02M 3/335* (2013.01); *H02M 2001/0006* (2013.01); *H02P 5/00* (2013.01)

(58) Field of Classification Search
USPC ...................................................... 318/400.3
See application file for complete search history.

(56) References Cited

U.S. PATENT DOCUMENTS

| | | |
|---|---|---|
| 5,818,670 A | 10/1998 | Ahn |
| 6,355,990 B1 | 3/2002 | Mitchell |
| 7,309,968 B2 | 12/2007 | Strike et al. |
| 9,184,668 B2 * | 11/2015 | Telefus ............. H02M 3/33523 |
| 9,197,136 B2 * | 11/2015 | Fang ....................... H02M 1/34 |
| 2002/0122326 A1 * | 9/2002 | Chen ................. H02M 3/33561 363/97 |
| 2007/0070658 A1 * | 3/2007 | Na ..................... H02M 3/33507 363/21.01 |
| 2008/0094864 A1 | 4/2008 | Sekimoto et al. |
| 2014/0078782 A1 | 3/2014 | Rosado et al. |

FOREIGN PATENT DOCUMENTS

| | | |
|---|---|---|
| EP | 1998429 A2 | 12/2008 |
| WO | 0221670 A1 | 3/2002 |
| WO | WO 02/21670 A1 * | 3/2002 ............. H02M 3/28 |

OTHER PUBLICATIONS

Singapore Search Report for Application No. 10201401850R mailed Sep. 25, 2015.

\* cited by examiner

MOTOR DRIVE SWITCHED MODE POWER SUPPLY SYSTEMS AND METHODS

BACKGROUND

The present disclosure generally relates to motor drives, and more particularly to the use of switched mode power supplies in motor drives.

Electric motors and motor drives are generally used throughout industrial, commercial, material handling, process and manufacturing settings, to mention only a few. For example, in a manufacturing setting, a motor drive may provide drive power to an electric motor used to move a load, such as a conveyer belt, fan, or any other machine. A typical motor drive employed with a single or three phase induction motor utilizes power from the power grid, and performs power conversion to produce output power with desired current, voltage, or frequency characteristics. More specifically, control circuitry may control operation of the motor drive to output power with the desired characteristics.

To facilitate operation of the control circuitry, a switched mode power supply may supply power to the control circuitry as well as other components, such as safety circuitry, driver circuitry, protection circuitry, or auxiliary circuitry. Generally, a switched mode power supply may include a single control loop that controls the electrical power (e.g., voltage or current) output by the switched mode power supply. For example, when the switched mode power supply utilizes a flyback converter, a switch may be included on the primary side of the flyback converter to control the electrical power output by the switched mode power supply by controlling the amount of electrical energy stored in the primary side. Moreover, the structure of a switched mode power supply is generally fixed. For example, when the switched mode power supply utilizes a flyback converter, the number of windings on the primary side and the number of windings on the secondary side may be fixed. In other words, the electrical power output by the switched mode power supply is generally fixed to operation of the primary side.

Accordingly, it would beneficial to improve the flexibility of operation of a switched mode power supply by increasing the amount of control over the electrical power output by a switched mode power supply. For example, increasing the amount of control over the output electrical power may enable structurally identical switched mode power supplies to be utilized in different motor drives.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a motor drive that includes driver circuitry that controls operation of an inverter in the motor drive to output power to a motor, control circuitry that controls operation of the driver circuitry, and a switched mode power supply that supplies electrical power to the driver circuitry, the control circuitry, or both. The switched mode power supply includes a primary coil, in which a primary controller stores electrical energy in the primary coil by selectively connecting the primary coil to a power source, and a secondary coil electrically isolated from the primary coil, in which the secondary coil outputs electrical power based at least in part on the electrical energy stored in the primary coil, in which a secondary controller controls the electrical power supplied to the driver circuitry, the control circuitry, or both by selectively connecting the secondary coil to a power output of the switched mode power supply.

A second embodiment describes a plurality of motor drives that includes a first motor drive that provides drive power to a first motor at a first power rating, in which the first motor drive comprises a first control module that controls operation of the first motor drive, and a second motor drive that provides drive power to a second motor at a second power rating, in which the second power rating is different from the first power rating and the second motor drive includes a second control module that controls operation of the second motor drive. The first control module is powered by a first switched mode power supply and the second control module is powered by a second switched mode power supply, in which the first switched mode power supply and the second switched mode power supply are structurally identical.

A third embodiment describes a switched mode power supply that includes a first secondary circuit including a first secondary coil and a first secondary controller, in which the first secondary coil outputs electrical power based at least in part on voltage induced across the first secondary coil by a primary coil and the first secondary controller controls electrical power output by the first secondary circuit by selectively connecting the first secondary coil to a first power output. The switching mode power supply further includes a second secondary circuit including a second secondary coil and a second secondary controller, in which the second secondary coil outputs electrical power based at least in part voltage induced across the second secondary coil, and the second secondary controller controls electrical power output by the second secondary circuit by selectively connecting the second secondary coil to a second power output.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
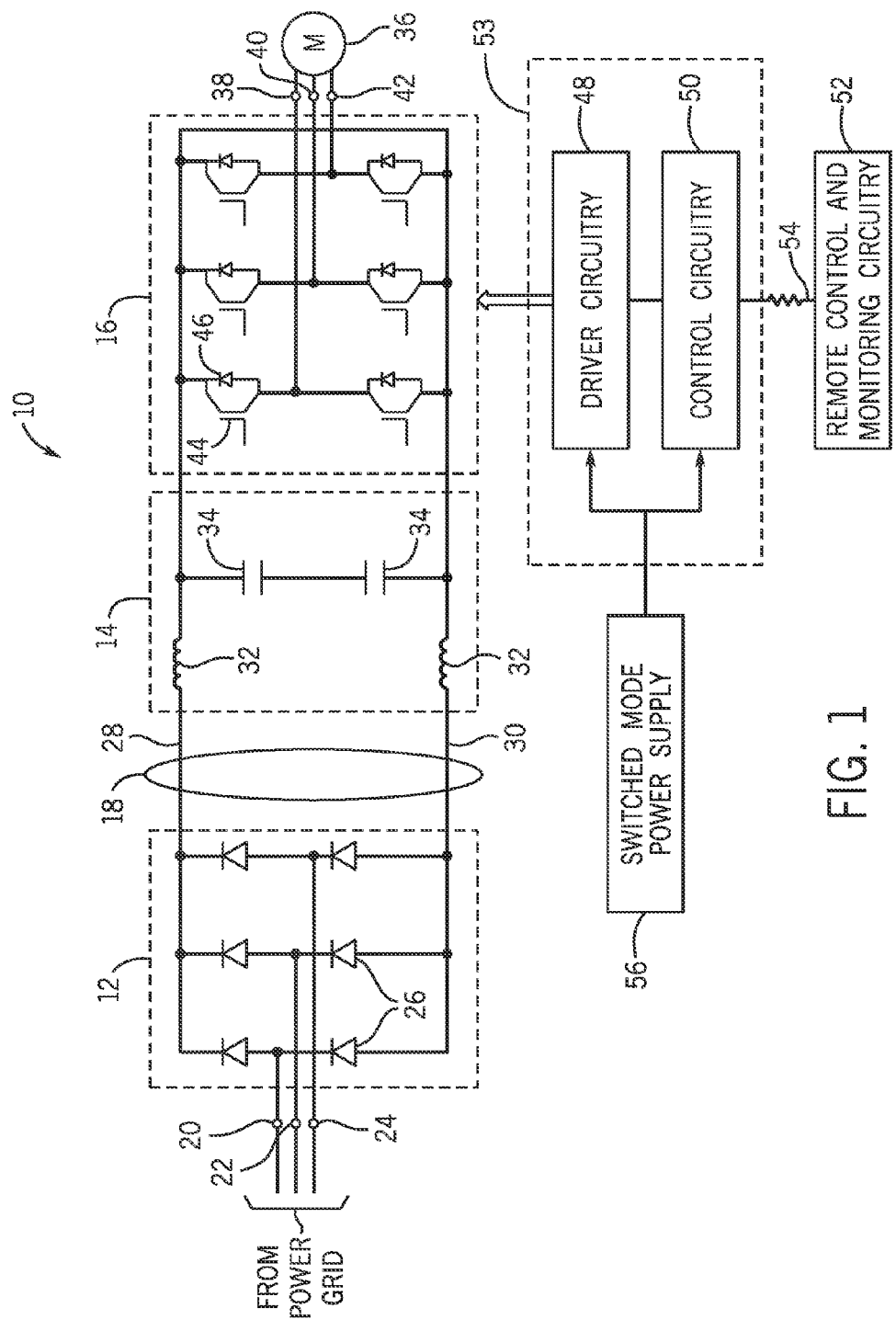
FIG. 1 depicts a block diagram of a motor drive utilizing a switched mode power supply, in accordance with an embodiment of the disclosed techniques.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described above, a switched mode power supply may be used to provide power to electronic circuits in a motor drive, such as control circuitry, driver circuitry, safety circuitry, protection circuitry, auxiliary circuitry, and the like. Since the various electronic circuits may utilize electrical power with differing characteristics (e.g., different voltage or different current), a switched mode power supply may include multiple power outputs. For example, a first power output may supply power to control circuitry and a second power output may supply power to driver circuitry.

More specifically, to control the characteristics of the electrical power supplied to the various electronic circuits in the motor drive, a switched mode power supply may include a single control loop that controls the electrical power (e.g., voltage or current) output by controlling the duty cycle of the primary side of a converter (e.g., flyback converter) used in the switched mode power supply. However, since the structure of the switched mode power supply is generally fixed, the electrical power output at each of the various power outputs is fixed to operation of the primary side. Illustratively, the relationship between the output voltage (e.g., $V_{out}$) and the input voltage (e.g., $V_{in}$) for a flyback converter may described as follows:

$$V_{out} = V_{in} \cdot \frac{N_2}{N_1} \frac{t}{T-t} \quad (1)$$

where t is the period when a primary coil is charged, T−t is the period when the primary coil is discharged, $N_2$ is the number of windings in a secondary coil, and $N_1$ is the number of windings in the primary coil. Thus, since the number of windings in the primary and secondary coils is generally fixed, the voltage output at each of the various power outputs changes proportionally with the charging and discharging time periods.

Accordingly, one embodiment of the present disclosure describes a motor drive that includes driver circuitry that controls operation of an inverter in the motor drive to output power to a motor, control circuitry that controls operation of the driver circuitry, and a switched mode power supply that supplies electrical power to the driver circuitry, the control circuitry, or both. The switched mode power supply includes a primary coil, in which a primary controller stores electrical energy in the primary coil by selectively connecting the primary coil to a power source, and a secondary coil electrically isolated from the primary coil, in which the secondary coil outputs electrical power based at least in part on the electrical energy stored in the primary coil, in which a secondary controller controls the electrical power supplied to the driver circuitry, the control circuitry, or both by selectively connecting the secondary coil to a power output of the switched mode power supply. In other words, the flexibility of operation of the switched mode power supply may be increased by enabling the electrical power supplied by each power output to be independently controlled. More specifically, the secondary controller may control the characteristics of the electrical power (e.g., voltage or current) supplied by varying the time the secondary coil is connected to the power output. For example, the secondary controller may increase voltage output by increasing time the secondary coil is connected to the power output. On the other hand, the secondary controller may decrease voltage output by decreasing time the secondary coil is connected to the power output. In other words, the secondary controller may control characteristics of the supplied electrical power by varying the duty cycle of the secondary coil. Thus, the techniques described herein may additionally enable the characteristics (e.g., voltage or current) of the electrical power supplied at each power output to be independently controlled.

By way of introduction, a block diagram of a motor drive 10 is depicted in FIG. 1. In some embodiments, the motor drive 10 may be a PowerFlex drive manufactured by Rockwell Automation of Milwaukee, Wis. As depicted, the motor drive 10 includes rectifier circuitry 12, various conditioning and support circuitry 14, and inverter circuitry 16 each coupled to a DC bus 18. More specifically, a three phase power source, such as a power grid, is electrically coupled to a set of input terminals 20, 22 and 24 to provide three phase AC power of constant frequency to the rectifier circuitry 12. It should be noted that the three-phase implementation described herein is not intended to be limiting, and the invention may be employed on single-phase circuitry, as well as on circuitry designed for applications other than motor drives.

In the rectifier circuitry 12, a set of six insulated gate bi-polar transistors (IGBTs) or silicon-controlled rectifiers (SCRs) 26 provide full wave rectification of the three phase voltage waveform. As depicted, the each input terminal entering the rectifier circuitry 12 is coupled between two IGBTs 26 arranged in series, anode to cathode, which span from the high side 28 of the DC bus 18 to the low side 30 of the DC bus 18. Accordingly, the rectifier circuitry 12 produces a rectified DC voltage that is applied to the DC bus 28.

Additionally, as depicted, the various conditioning and support circuitry 14 may include inductors 32 and/or capacitors 34, for example, to smooth the rectified DC voltage waveform. More specifically, the inductors 42 and capacitors 44 may remove most of the AC ripple in the DC voltage output by the rectifier circuitry 12. In other words, the various conditioning and support circuit enable the DC bus 18 to carry a waveform closely approximating a true DC voltage.

Furthermore, the inverter circuitry 16 produces driving power at a desired frequency to driving a motor 36 connected to the output terminals 38, 40 and 42. More specifically, as depicted, the inverter circuitry 16 includes two switches 44 (e.g., IGBTs) coupled in series, collector to emitter, between the high side 28 and low side 30 of the DC bus 18. Three of these switch pairs are then coupled in parallel to the DC bus 18, for a total of six switches 44. Each switch 44 is paired with a flyback diode 46 such that the collector is coupled to the anode and the emitter is coupled to the cathode. Each of the output terminals 38, 40 and 42 is coupled to one of the switch outputs between one of the pairs of switches 44. The three phase power used to drive the motor 36 is produced by rapidly opening and closing the switches 44.

To control the opening and closing of the switches 44, driver circuitry 48 generates gate drive signals that are applied to the switches 44. In some embodiments, the driver circuitry 42 may base the timing of the gate drive signals upon any desired algorithm, such as utilizing triangular carrier waves and other techniques generally known in the art. More specifically, because control circuitry 50 may generally control operation of the motor drive 10, the operation of the driver circuitry 48 (e.g., timing of the gate drive signals) may also be controlled by the control circuitry 50. As used herein, the driver circuitry 48 and the control circuitry 50 may generally be referred to as the "control module" 53. Additionally, in some embodiments, the control circuitry 50 may be coupled to remote control and monitoring circuitry 52 via a network 54, which enables remote monitoring and control of the motor drive 10. In some embodiments, the network 54 may utilize various communication protocols such as DeviceNet, Profibus, or Ethernet.

As described above, a switched mode power supply 56 may supply electrical power to various electronic circuitry included in the motor drive 10, such as the control module 53. Accordingly, as depicted, the switched mode power supply 56 may supply electrical power to the driver circuitry 48, the control circuitry 50, or both. More specifically, as will be described in more detail below, the switched mode power supply 56 may supply electrical power to the driver circuitry 48 and/or the control circuitry 50 with the desired characteristics (e.g., voltage or current) by converting electrical power received from an input power source. In some embodiments, the input power source may be the DC bus 18, the power grid, or another external power source.

Figure 2:
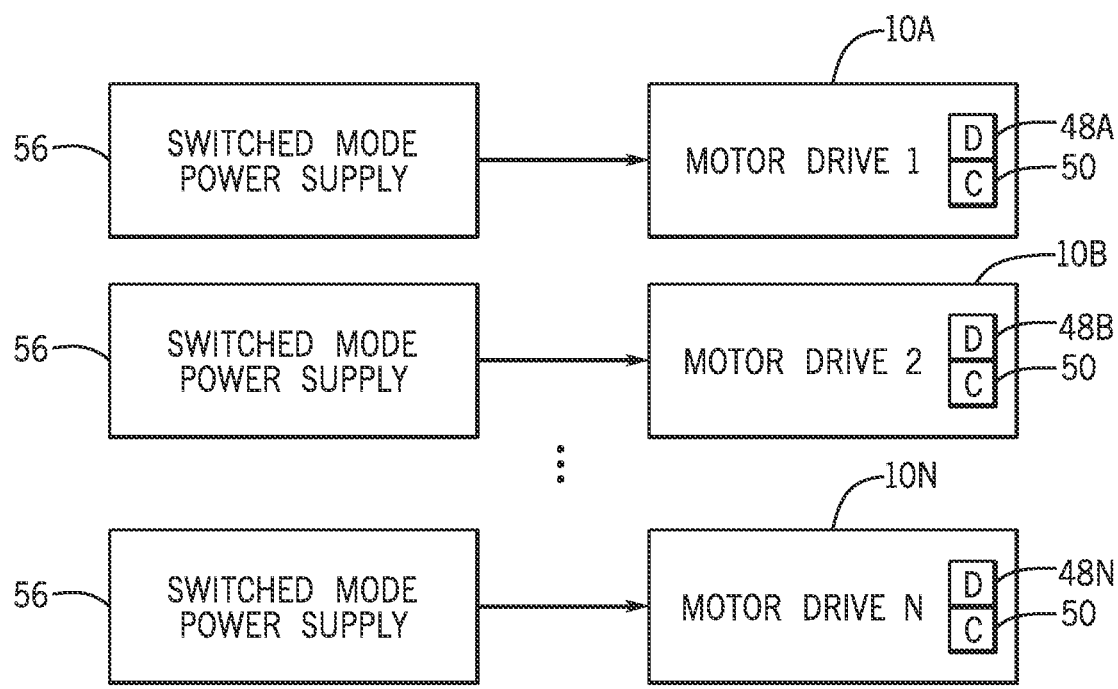
FIG. 2 depicts a block diagram of a plurality of varying motor drives each utilizing a structurally identical switched mode power supply, in accordance with an embodiment of the disclosed techniques.

As described above, motor drives 10 may be used in various settings, such as industrial, commercial, material handling, process and manufacturing settings. Accordingly, manufacturers often produce motor drives 10 with varying power ratings. For example, a motor drive 10 with a lower power rating may be used to drive a motor in a conveyer belt, whereas a motor drive 10 was a higher rating may be used to drive a turbine motor. To help illustrate, FIG. 2 depicts a plurality of motor drives 10 that is each supplied power from a switched mode power supply 56. More specifically, the plurality of motor drives 10 may represent a product family. As used herein, a "product family" is intended to motor drives 10 that are functionally similar with slightly different characteristics, such as different frame sizes or different power ratings. For example, the first motor drive 10A may drive a motor at 150 horsepower, the second motor drive 10B may drive a motor at 300 horsepower, and the nth motor drive 10N may drive a motor at 2000 horsepower. Additionally, the first motor drive 10A may be included in a frame approximately 26.2 in.×12.13 in.×13.64 in., the second motor drive 10B may be included in a frame approximately 34.7 in.×16.93 in.×13.78 in., and the nth motor drive 10N may be included in a frame approximately 96.6 in.×70.9 in.×23.6 in. In addition to the three motor drives 10A, 10B, and 10N depicted, the product family may additionally include other motor drives 10 with varying power ratings (e.g., between 1-2000 horsepower) and varying frame sizes.

Because the motor drives 10A, 10B, and 10N may be part of the same product family (e.g., functionally similar), control of the motor drives may be generally the same. For example, although the driving power output may differ, the timing of the gate drive signals applied to the switches 44 may generally be same. Accordingly, as depicted, each of the motor drives 10A, 10B, and 10N may include generally identical control circuitry 50. Additionally, since each of the motor drives 10A, 10B, and 10N utilizes generally identical control circuitry 50, structurally identical switched mode power supplies 56 may also be used to supply power to the control circuitry 50. In other words, structurally identical switched mode power supplies 56 may be used because the control circuitry 50 in each motor drive 10A, 10B, and 10N will generally utilize electrical power with the same characteristics (e.g., same voltage and current).

However, since the driving power output may differ, the characteristics of the switches 44 utilized each of the motor drives 10A, 10B, and 10N may be different (e.g., different threshold voltage). For example, because the switches 44 in motor drive 10N may be used to conduct larger amounts of electrical power, the voltage of the gate signals applied to the switches 44 in motor drive 10C may be higher than the voltage of the gate signals applied to the switches 44 in motor drive 10B. Similarly, the voltage of the gates signals applied to the switches 44 in motor drive 10B may be greater than the voltage of the gate signals applied to the switches in motor drive 10A. To supply the different voltage gate signals, the driver circuitry 48 used in each of the motor drives 10A, 10B, and 10C may each utilize electrical power with different characteristics. For example, driver circuitry 48N in motor drive 10N may utilize electrical power with a higher voltage than driver circuitry 48B in motor drive 10B. Similarly, driver circuitry 48B in motor drive 10B may utilize electrical power with a higher voltage than driver circuitry 48A in motor drive 10A.

Nevertheless, as depicted, the structurally identical switched mode power supplies 56 may be utilized to provide power to the driver circuitry 48 included in each motor drive 10A, 10B, or 10N. In other words, the techniques described herein enable electrical power output by the switched mode power supply 56 to be independently controlled, which enables structurally identical switched mode power supplies 56 to be utilized in varying motor drives (e.g., 10A, 10B, or 10N). Since the switched mode power supplies 56 are structurally identical (e.g., utilize the same configuration of components), certification barriers may be reduced. For example, instead of certifying a different switched mode power supply for use in each motor drive 10A, 10B, and 10N, a single switched mode power supply 56 may be certified under Underwriters Laboratories (UL) 60950-1 or International Electrotechnical Commission (IEC) 61204-7. Additionally, since electrical power output may be independently controlled, the switched mode power supply 56 may compensate for other changes in circuitry over time. For example, as the control circuitry 50 ages, the control circuitry 50 may desire greater amounts of electrical power.

Figure 3:
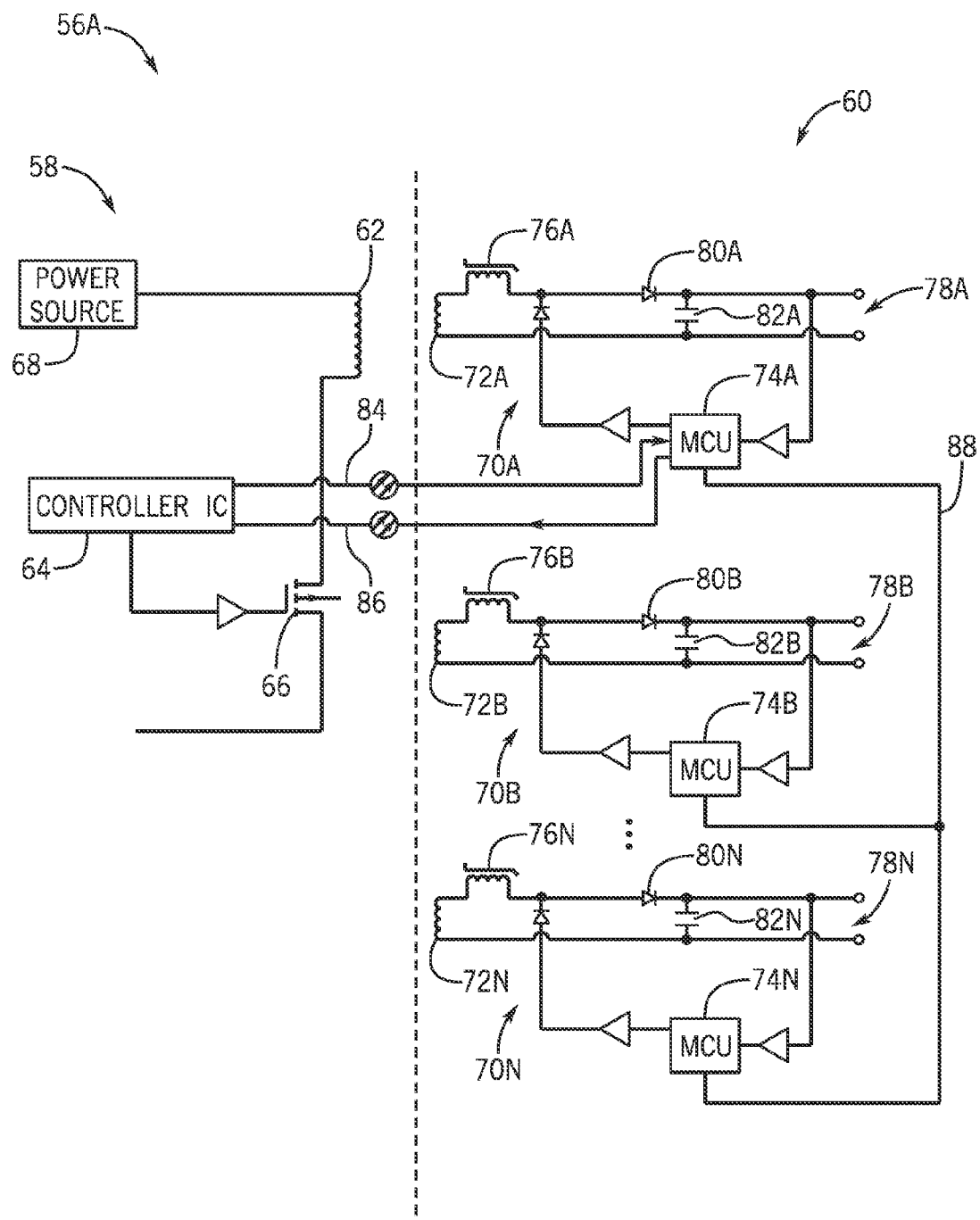
FIG. 3 depicts a block diagram of a first embodiment of the switched mode power supply of FIG. 1, in accordance with an embodiment of the disclosed techniques.

To help illustrate, one embodiment of a switched mode power supply 56A is depicted in FIG. 3. As depicted, the switched mode power supply 56A utilizes a flyback converter topology, which includes a primary side 58 electrically isolated from a secondary side 60. More specifically, the primary side 58 includes a primary coil 62, a primary controller 64, and a power switch 66. Additionally, the secondary side 60 includes a plurality of secondary circuits 70A, 70B, and 70N. More specifically, each of the secondary circuits 70A, 70B, and 70N includes a secondary coil 72, a secondary controller 74, a magnetic amplifier 76, and a power output 78.

It should be noted that although in the present embodiment a power switch 66 and a magnetic amplifier 76 are utilized, in other embodiments any suitable switch may be utilized such as a hardware switch, a relay, or a transistor. In other words, the magnetic amplifier 76 acts as a magnetic switch controllable by the secondary controller 74. More specifically, the secondary controller 74 may open or close the magnetic amplifier 76 by supplying different amounts of current to the magnetic amplifier. For example, when a lower current is supplied, the magnetic amplifier 76 will have a low impedance (e.g., the magnetic amplifier 76 is closed). On the other hand, when a higher current is supplied, the magnetic amplifier will have a high impedance (e.g., the magnetic amplifier 76 is open).

Generally, in operation, electrical energy is stored in the primary side 62 and each of the plurality of secondary circuits 70A, 70B, and 70N output electrical power based at least in part on the stored electrical energy. More specifically, the primary controller 64 may store energy in the primary coil 62 by closing the power switch 66, which connects the primary coil 62 to an external power source 68. As described above, the switched mode power supply 56A receives electrical power from a power source 68, such as the DC bus 18 or the electrical grid. Thus, in some embodiments, the primary coil 62 may store electrical energy based on input power between 300-400 volts received from the DC bus 18 or 24 VDC input power from an external power source. In other words, when the power switch 66 is closed, the primary coil 62 may act as an inductor to store electrical energy.

To simplify the discussion, operation of the secondary side 60 will first be described in relation to a single secondary circuit 70. On the secondary side 60, current does not flow through the secondary coil 72 while the power switch 66 is closed. More specifically, storing electrical energy in the primary coil 62 induces a negative voltage across the secondary coil 72, which reverse biases the diode 80. In some embodiments, if the capacitor 82 included in the secondary circuit 70 has stored electrical energy, the capacitor 82 may output electrical power to the power output 78.

When the power switch 66 is opened, the voltage across the secondary coil 72 goes positive, which enables electrical power to flow from the secondary coil 72 based at least in part on the electrical energy stored in the primary coil 62 and the ratio of windings in the primary coil 62 to windings in the secondary coil 72. In some embodiments, the voltage of the electrical power output by the secondary coil may be 5 volts or 12 volts when rectified. As described above, the magnetic amplifier 76 generally acts as a switch. In other words, when the magnetic amplifier 76 is closed, electrical power flows from the secondary coil 72 to the power output 78. More specifically, the electrical power flowing from the secondary coil 72 may be rectified by the diode 80, smoothed by the capacitor 82, and output at the power output 78. On the other hand, when the magnetic amplifier 76 is open, electrical power output by the secondary coil 72 is blocked.

Accordingly, the secondary controller 74 in each secondary circuit 78 may control the characteristics (e.g., voltage or current) of electrical power supplied at the power output 78 by controlling (e.g., opening and closing) the magnetic amplifier 76. For example, to increase the voltage or current output, the secondary controller 74 may increase the time the secondary coil 72 is connected to the power output 78 (e.g., by increasing the time the magnetic amplifier 76 is closed). Conversely, to decrease the voltage or current output, the secondary controller 74 may decrease the time the secondary coil 72 is connected to the power output 78 (e.g., by decreasing the time the magnetic amplifier is closed).

As depicted, each secondary circuit 70A, 70B, and 70N generally includes the same structure. In other words, utilizing the techniques described herein, each secondary controller 74A, 74B, or 74N may independently control the electrical power supplied at a corresponding power output 78A, 78B, or 78N. To help illustrate, the first power output 78A may supply electrical power to control circuitry 50 and the second power output 78B may supply electrical power to driver circuitry 48. Thus, the first secondary controller 74A may control the first secondary circuit 70A, and more specifically the magnetic amplifier 76A, to supply electrical power to the control circuitry 50 with the characteristics (e.g., voltage or current) desired by the control circuitry 50. Similarly, the second secondary controller 74B may control the second secondary circuit 70B, and more specifically the magnetic amplifier 76B, to supply electrical power to the driver circuitry 48 with the characteristics (e.g., voltage or current) desired by the driver circuitry 48.

In some embodiments, the primary controller 64 may communicate the desired characteristics to the secondary controllers. As described above, the primary side 58 and the second side 60 may be electrically isolated. Accordingly, as in the depicted embodiment, the primary controller 64 and the secondary controller 74A are communicatively coupled via optical cables 84 and 86. For example, the primary controller 64 may communicate the desired characteristics as an optical signal to the secondary controller 74A via the first optical cable 84. Similarly, the secondary controller 74A may communicate feedback information as an optical signal to the primary controller 64 via the second optical cable 86. In some embodiments, the feedback signal may include diagnostic information, status information, operation information, or any combination thereof. Additionally, in some embodiments, the feedback signal may be communicated in accordance with the Session Initiation Protocol (SIP) or any other suitable communication protocol. It should be noted that although optical communication is described, other suitable communication signals, such as electrical signals, may also be utilized.

Additionally, in the depicted embodiment, only the first secondary controller 74A directly communicates with the primary controller 64. Instead, the other secondary controllers 74B and 74N are communicatively coupled to the first secondary controller 74A via, for example, a serial bus 88. In other words, each of the secondary controllers 74A, 74B, and 74N may communicate with one another via the serial bus 88. Accordingly, the other secondary controllers 74 and 74N may communicate with the primary controller 64 through the first secondary controller 74A. For example, the primary controller 64 may communicate the desired characteristics of electrical power to be output by the second secondary circuit 70B to the first secondary controller 74A via the optical cable 84. The first secondary controller 74 may then communicate the desired characteristics to the second secondary controller 74B via the serial bus 88. In such an embodiment, the amount of optical cabling may be minimized. Additionally or alternatively, in other embodiments, each secondary controller 74A, 74B, and 74N may each directly communicate with the primary controller 64 or may directly receive the desired characteristics.

Figure 4A:
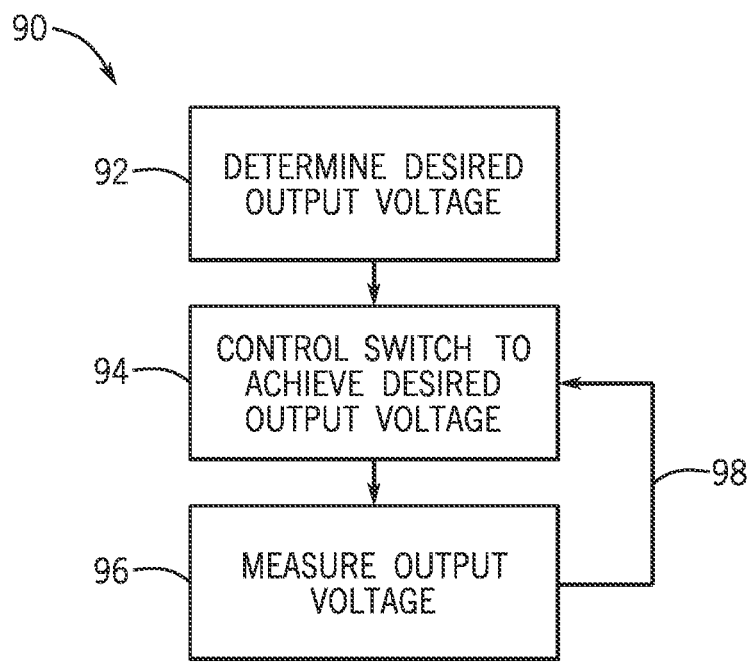
FIG. 4A depicts a flow chart describing a process for controlling voltage output by the switched mode power supply of FIG. 3, in accordance with an embodiment of the disclosed techniques.

As described above, the electrical power output by each secondary circuit 70A, 70B, and 70B may be independently controlled based on desired characteristics. For example, a secondary controller 74 may independently control voltage of outputted electrical power. One embodiment of a process 90 for controlling the voltage output by the switched mode power supply 56 is described in FIG. 4A (e.g., voltage control mode). Generally, the process 90 includes determining a desired output voltage (process block 92), controlling the switch to achieve the desired output voltage (process block 94), measuring the output voltage (process block 96), and making any additional adjustments to the control of the switch to achieve the desired output voltage (arrow 98).

As described above, the primary controller 64 may determine the desired output voltage and communicate the desired output voltage to the corresponding secondary controller 74 (process block 92). More specifically, the primary controller 64 may determine the desired output voltage based at least in part on the circuitry that is supplied the electrical power. For example, the primary controller 64 may poll circuitry when the circuitry is connected to the power output 78 for the voltage it desires to receive. Additionally or alternatively, a user may directly instruct the primary controller 64 or the secondary controller 74 of the desired output voltage.

Moreover, the primary controller 64 may communicate the desired output voltage to the corresponding secondary controller 74 via the optical cable 84. For example, to communicate the desired output voltage to the first secondary controller 74A, the primary controller 64 may communicate the desired output voltage directly to the first secondary controller 74A via the optical cable 84. To communicate the desired output voltage to the second secondary controller 74B, the primary controller 64 may communicate the desired output voltage to the first secondary controller 74A via the optical cable 84 and the first secondary controller 74A may relay the desired output voltage to the second secondary controller 74B via the serial bus 88.

Based on the desired output voltage, the secondary controller 74 may control the magnetic amplifier 76 (e.g., switch) to achieve the desired output voltage (process block 94). More specifically, as described above, the secondary controller 74 may control the voltage output by opening (e.g., disconnecting the secondary coil 72) and closing (e.g., connecting the secondary coil 72) the magnetic amplifier 76. For example, to increase the voltage output, the secondary controller 74 may increase time the magnetic amplifier 76 is closed. On the other hand, to decrease the voltage output, the secondary controller 74 may decrease time the magnetic amplifier 76 is closed.

The output voltage may then be measured to ensure that the output voltage is the same as or close to (e.g., within acceptable tolerance) the desired output voltage (process block 96). More specifically, in some embodiments, a voltage sensor may measure the output voltage and communicate the measured voltage to the secondary controller 76. Based on the measured voltage, the secondary controller 76 may adjust its control of the magnetic amplifier 76 to achieve the desired output voltage (arrow 98). In other words, the secondary controller 76 may adjust the output voltage in a feedback loop.

Figure 4B:
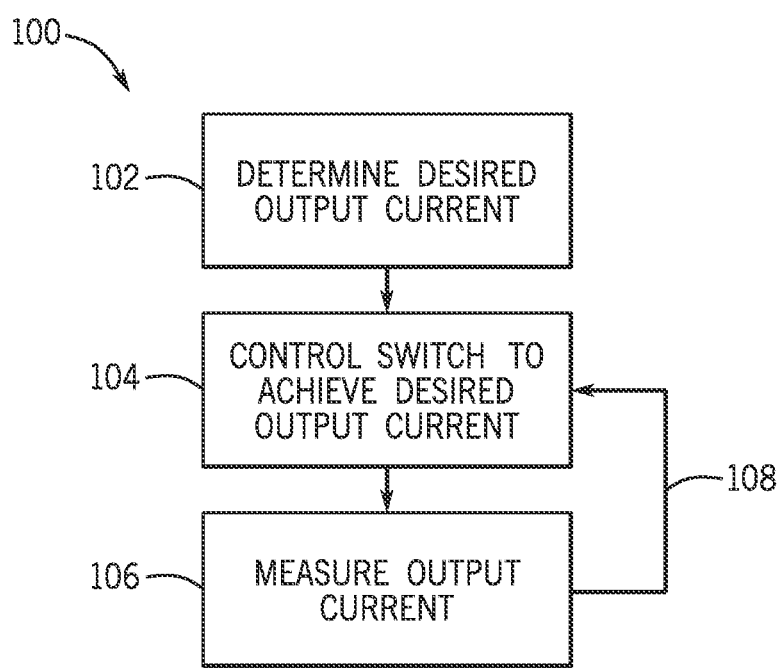
FIG. 4B depicts a flow chart describing a process for controlling current output by the switched mode power supply of FIG. 3, in accordance with an embodiment of the disclosed techniques.

Additionally or alternative, a secondary controller 74 may independently control current of outputted electrical power. One embodiment of a process 100 for controlling the current output by the switched mode power supply 56 is described in FIG. 4B (e.g., current control mode). Generally, the process 100 includes determining a desired output current (process block 102), controlling the switch to achieve the desired output current (process block 104), determining the output current (process block 106), and making any additional adjustments to the control of the switch to achieve the desired output current (arrow 108).

Similar to process block 92, the primary controller 64 may determine the desired output current and communicate the desired output current to the corresponding secondary controller 74 (process block 102). More specifically, the primary controller 64 may determine the desired output current based at least in part on the circuitry that is supplied the electrical power. For example, the primary controller 64 may poll circuitry when the circuitry is connected to the power output 78 for the current it desires to receive. Additionally or alternatively, a user may directly instruct the primary controller 64 or the secondary controller 74 of the desired output current.

The primary controller 64 may then communicate the desired output current to the corresponding secondary controller 74 via the optical cable 84. For example, to communicate the desired output current to the first secondary controller 74A, the primary controller 64 may communicate the desired output current directly to the first secondary controller 74A via the optical cable 84. To communicate the desired output current to the second secondary controller 74B, the primary controller 64 may communicate the desired output current to the first secondary controller 74A via the optical cable 84 and the first secondary controller 74A may relay the desired output current to the second secondary controller 74B via the serial bus 88.

Similar to process block 94, the secondary controller 74 may control the magnetic amplifier 76 (e.g., switch) to achieve the desired output current (process block 104). More specifically, as described above, the secondary controller 74 may control the current output by opening (e.g., disconnecting the secondary coil 72) and closing (e.g., connecting the secondary coil 72) the magnetic amplifier 76. For example, to increase the current output, the secondary controller 74 may increase time the magnetic amplifier 76 is closed. On the other hand, to decrease the current output, the secondary controller 74 may decrease time the magnetic amplifier 76 is closed.

Similar to process block 96, the output current may then be determined to ensure that the output current is the same as or close to (e.g., within acceptable tolerance) the desired output current (process block 106). More specifically, in some embodiments, the current may be directly measured with a current sensor and communicated to the secondary controller 76. Additionally or alternatively, the current may be determined by measuring a proxy. For example, the secondary controller 76 may determine the output current by measuring the output voltage and calculating the corresponding current. Based on the determined current, the secondary controller 76 may adjust its control of the magnetic amplifier 76 to achieve the desired output current (process block 98). In other words, the secondary controller 76 may adjust the output current in a feedback loop.

Figure 5:
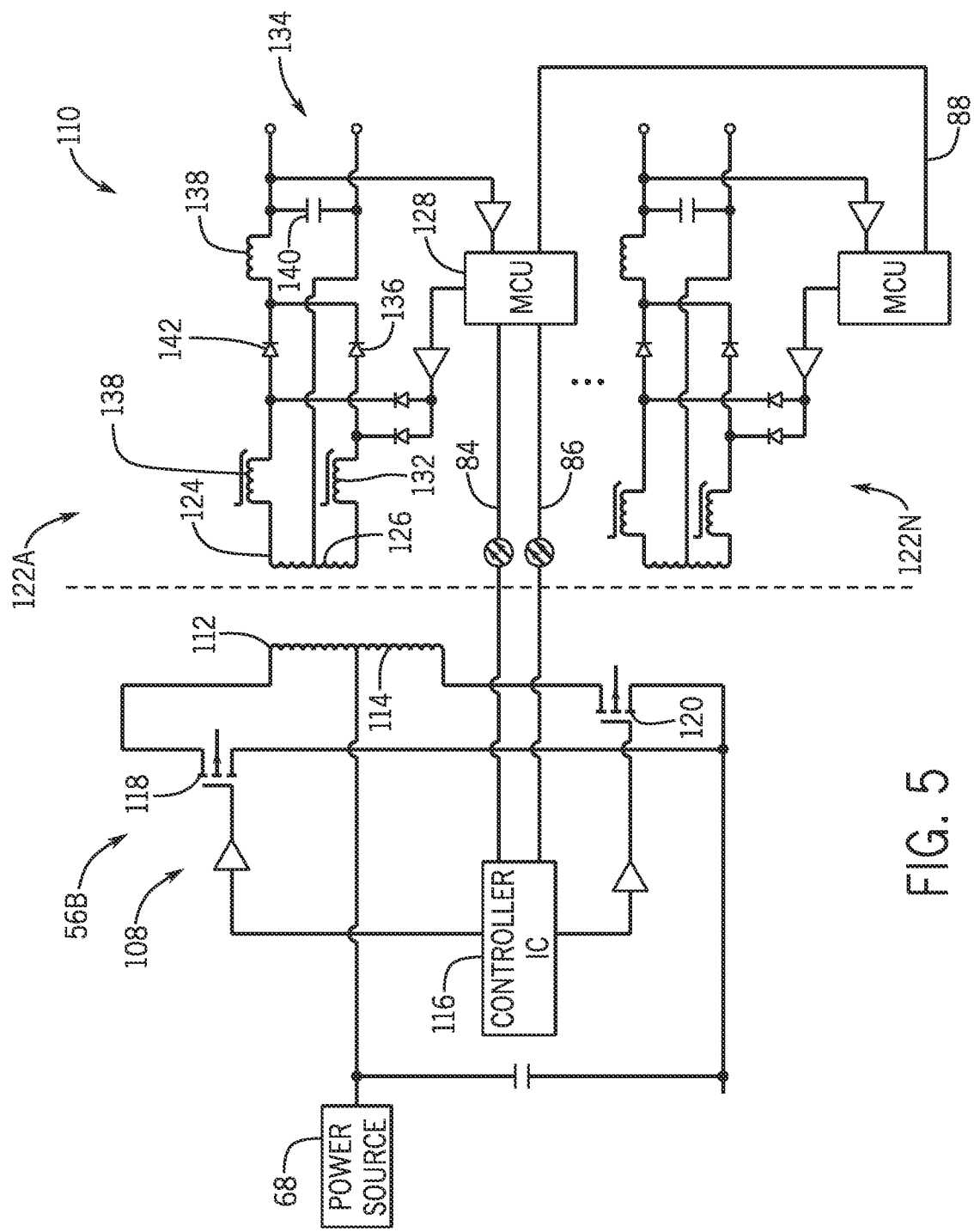
FIG. 5 depicts a block diagram of a second embodiment of the switched mode power supply of FIG. 1, in accordance with an embodiment of the disclosed techniques.

In addition to the flyback converter topology described above, other converter topologies may be utilized in a switched mode power supply 56, such as a forward converter, a push-pull converter, a half bridge converter, or a full bridge converter. For example, a switched mode power supply 56B utilizing a push-pull converter topology is depicted in FIG. 5. As depicted, the switched mode power supply 56B includes a primary side 108 and a secondary side 110. More specifically, the primary side 108 includes a first primary coil 112, a second primary coil 114, a primary controller 116, a first power switch 118, and a second power switch 120. Additionally, the secondary side 110 includes a plurality of secondary circuits 122A to 122N. More specifically, each of the secondary circuits includes a first secondary coil 124, a second secondary coil 126, a secondary controller 128, a first magnetic amplifier 130, a second magnetic amplifier 132, and a power output 134. As discussed above, although in the present embodiment a power switches and a magnetic amplifiers are utilized, in other embodiments any suitable switch may be utilized such as a hardware switch, a relay, or a transistor.

Generally, in operation, each of the plurality of secondary circuits 122A to 122N output electrical power based at least in part on the electrical power induced in the secondary coils 126 and 128. More specifically, the primary controller 116 may induce a negative voltage in the second secondary coil 126 by opening the second power switch 120 and closing the first power switch 118, which connects the first primary coil 112 to the external power source 68. In other words, when the first power switch 118 is closed and the second power switch 120 is open, electrical power flows from the second secondary coil 126 to the power output 134. More specifically, the electrical power flowing from the second secondary coil 126 may be rectified by the diode 136, smoothed by the inductor 138 and/or capacitor 140, and output at the power output 134. Conversely, the primary controller 116 may induce a positive voltage in the first secondary coil 124 by opening the first power switch 118 and closing the second power switch 120, which connects the second primary coil 114 to the external power source. In other words, when the first power switch 118 is open and the second power switch 120 is closed, electrical power flows from the first secondary coil 124 to the power output 134. More specifically, the electrical power flowing from the first secondary coil 124 may be rectified by the diode 142, smoothed by the inductor 138 and/or capacitor 140, and output at the power output 134.

Accordingly, similar to switched mode power supply 56A, the secondary controller 128 may control characteristics (e.g., voltage or current) of the electrical power output at the power output 134 by opening and closing the magnetic amplifiers 130 and 132. For example, to increase the voltage or current output, the secondary controller 128 may increase the time the secondary coils 124 and 126 are connected to the power output 134 (e.g., by increasing the time the magnetic amplifiers 130 and 132 are closed). Conversely, to decrease the voltage or current output, the secondary controller 128 may decrease the time the secondary coils 124 and 126 is connected to the power output 124 (e.g., by decreasing the time the magnetic amplifiers 130 and 132 are closed).

Moreover, similar to switched mode power supply 56A, since each secondary circuit 122A and 122N generally includes the same structure, each secondary controller 128 may independently control the electrical power supplied at a corresponding power output 134. Additionally, similar to switched mode power supply 56A, the primary controller 116 may communicate the desired characteristics to the secondary controllers. For example, the primary controller 116 may communicate the desired characteristics as an optical signal to the secondary controller 128 via the first optical cable 84, and the secondary controller 128 may communicate feedback information as an optical signal to the primary controller 116 via the second optical cable 86. Furthermore, similar to switched mode power supply 56A, the secondary controller 128 may be communicatively coupled via a serial bus 88.

Technical effects of the present include improving the operational flexibility of a switched mode power supply. More specifically, the operational flexibility may be improved by enabling electrical power output at each power output of the switched mode power supply to be independently controlled. For example, in some embodiments, one or more switch (e.g., magnetic amplifier) is included in each secondary circuit to selectively connect a secondary coil to the power output. By varying the time the secondary coil is connected to the power output, each secondary controller may control the voltage and/or current of the outputted electrical power. In other words, instead of redesigning a switched mode power supply, the outputted electrical power may be controlled simply by programming a secondary controller.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive, comprising:
   driver circuitry configured to control operation of an inverter in the motor drive to output power to a motor;
   control circuitry configured to control operation of the driver circuitry; and
   a switched mode power supply configured to supply electrical power to the driver circuitry, the control circuitry, or both, wherein the switched mode power supply comprises:
   a primary coil, wherein a primary controller is configured to store electrical energy in the primary coil by selectively connecting the primary coil to a power source; and
   a first secondary coil electrically isolated from the primary coil, wherein the first secondary coil is configured to output electrical power based at least in part on the electrical energy stored in the primary coil, wherein a first secondary controller is configured to control the electrical power supplied by the first secondary coil to one of the driver circuitry and the control circuitry by selectively connecting the first secondary coil to a first power output of the switched mode power supply; and
   a second secondary coil electrically isolated from the primary coil, wherein the second secondary coil is configured to output electrical power based at least in part on the electrical energy stored in the primary coil, wherein a second secondary controller is configured to control the electrical power supplied to the other of the driver circuitry and the control circuitry by selectively connecting the second secondary coil to a second power output of the switched mode power supply; and
   wherein the first and second secondary controllers are in data communication with one another via a data bus.

2. The motor drive of claim 1, wherein the secondary controllers are configured to control voltage output by the switched mode power supply, current output by the switched mode power supply, or both.

3. The motor drive of claim 1, wherein each secondary controller is configured to increase the electrical power supplied by the switched mode power supply by increasing time the respective secondary coil is connected to the respective power output, and to decrease electrical power supplied by the switched mode power supply by decreasing time the respective secondary coil is connected to the respective power output.

4. The motor drive of claim 1, wherein each secondary controller is configured to selectively connect the respective secondary coil to the respective power output of the switched mode power supply based at least in part on a comparison between a voltage measured at the respective power output and a desired voltage output, wherein the desired voltage output is received from the primary controller.

5. The motor drive of claim 1, wherein each secondary controller is configured to selectively connect the respective secondary coil to the respective power output of the switched mode power supply based at least in part on a comparison between a current determined at the respective power output and a desired current output, wherein the desired current output is received from the primary controller.

6. The motor drive of claim 1, wherein each of the plurality of power outputs is configured to output a different voltage or a different current.

7. The motor drive of claim 1, wherein the primary controller is configured to selectively connect the primary coil to the power source via a first switch and secondary controller is configured to selectively connect the respective secondary coil to the respective power output of the switched mode power supply via respective second switch.

8. The motor drive of claim 1, wherein the primary controller is configured to selectively connect the primary coil to the power source via a power switch and each secondary controller is configured to selectively connect the respective secondary coil to the respective power output of the switched mode power supply via a respective magnetic amplifier.

9. The motor drive of claim 1, comprising a flyback converter, a forward converter, a push-pull converter, a half bridge converter, or a full bridge converter, wherein the flyback converter, the forward converter, the push-pull converter, the half bridge converter, or the full bridge converter comprises the primary coil and the secondary coils.

10. The motor drive of claim 1, comprising a DC bus, wherein the power source is the DC bus.

11. The motor drive of claim 1, wherein the first secondary controller is configured to transmit a feedback signal to the primary controller, wherein the feedback signal comprises diagnostic information, status information, operation information, or any combination thereof.

12. A method for operating a switched mode power supply, comprising:
selectively connecting a primary coil to a power source to store electrical power in the primary coil;
inducing a first voltage across a first secondary coil using the primary coil, wherein the primary coil and the first second coil are electrically isolated and the induced first voltage is based at least in part on the electrical power stored in the primary coil, wherein a first secondary controller is configured to control the electrical power supplied by the first secondary coil to one of motor driver circuitry and motor control circuitry of a motor drive by selectively connecting the first secondary coil to a first power output of the switched mode power supply;
outputting electrical power from a first power output to the motor drive by selectively connecting the first secondary coil to the first power output;
inducing a second voltage across a second secondary coil using the primary coil, wherein the primary coil and the second secondary coil are electrically isolated and the induced second voltage is based at least in part on the electrical power stored in the primary coil, wherein a second secondary controller is configured to control the electrical power supplied to the other of the driver circuitry and the control circuitry by selectively connecting the second secondary coil to a second power output of the switched mode power supply; and
outputting electrical power from a second power output to the motor drive by selectively connecting the second secondary coil to the second power output;
wherein the first and second secondary controllers are in data communication with one another via a data bus.

13. The method of claim 12,
wherein voltage of the electrical power output at the first power output is different from voltage of the electrical power output at the second power output or current of the electrical power output at the first power output is different from current of the electrical power output at the second power output.

14. The method of claim 12, wherein outputting electrical power from the first power output comprises:
determining voltage or current desired to be received by the motor drive from the first power output; and
adjusting duration the first secondary coil is connected to the first output to output electrical power with the desired voltage or current.

15. The method of claim 12, wherein outputting electrical power from the first power output comprises:
increasing duration the first secondary coil is connected to the first power output to increase electrical power output at the first power output; or
decreasing the duration the first second coil is connected to the first power output to decrease electrical power output at the first power output.

16. A switched mode power supply, comprising:
a first secondary circuit comprising a first secondary coil and a first secondary controller, wherein the first secondary coil is configured to output electrical power based at least in part on voltage induced across the first secondary coil by a primary coil and the first secondary controller is configured to control electrical power output by the first secondary circuit by selectively connecting the first secondary coil to a first power output; and
a second secondary circuit comprising a second secondary coil and a second secondary controller, wherein the second secondary coil is configured to output electrical power based at least in part voltage induced across the second secondary coil, and the second secondary controller is configured to control electrical power output by the second secondary circuit by selectively connecting the second secondary coil to a second power output;
wherein the first and second secondary controllers are in data communication with one another via a data bus.

17. The switched mode power supply of claim 16, wherein the first secondary controller is configured to increase the electrical power output by the first secondary circuit by increasing time the first secondary coil is connected to the first power output, and to decrease the electrical power output by the first secondary circuit by decreasing time the first secondary coil is connected to the first power output.

18. The switched mode power supply of claim 17, wherein the second secondary controller is configured to increase the electrical power output by the second secondary circuit by increasing time the second secondary coil is connected to the second power output, and to decrease the electrical power output by the second secondary circuit by decreasing time the first secondary coil is connected to the second power output.

19. The switched mode power supply of claim 16, wherein voltage or current output by the first power output and the second power output are different.

20. The switched mode power supply of claim 16, wherein the first secondary controller is communicatively coupled to a primary controller and to the second secondary controller, wherein the second secondary controller is configured to communicate with the primary controller via the first secondary controller.

* * * * *